March 20, 1934.  I. COWLES  1,951,860
METHOD OF MAKING UNIONS FOR METAL TUBING
Filed June 22, 1931
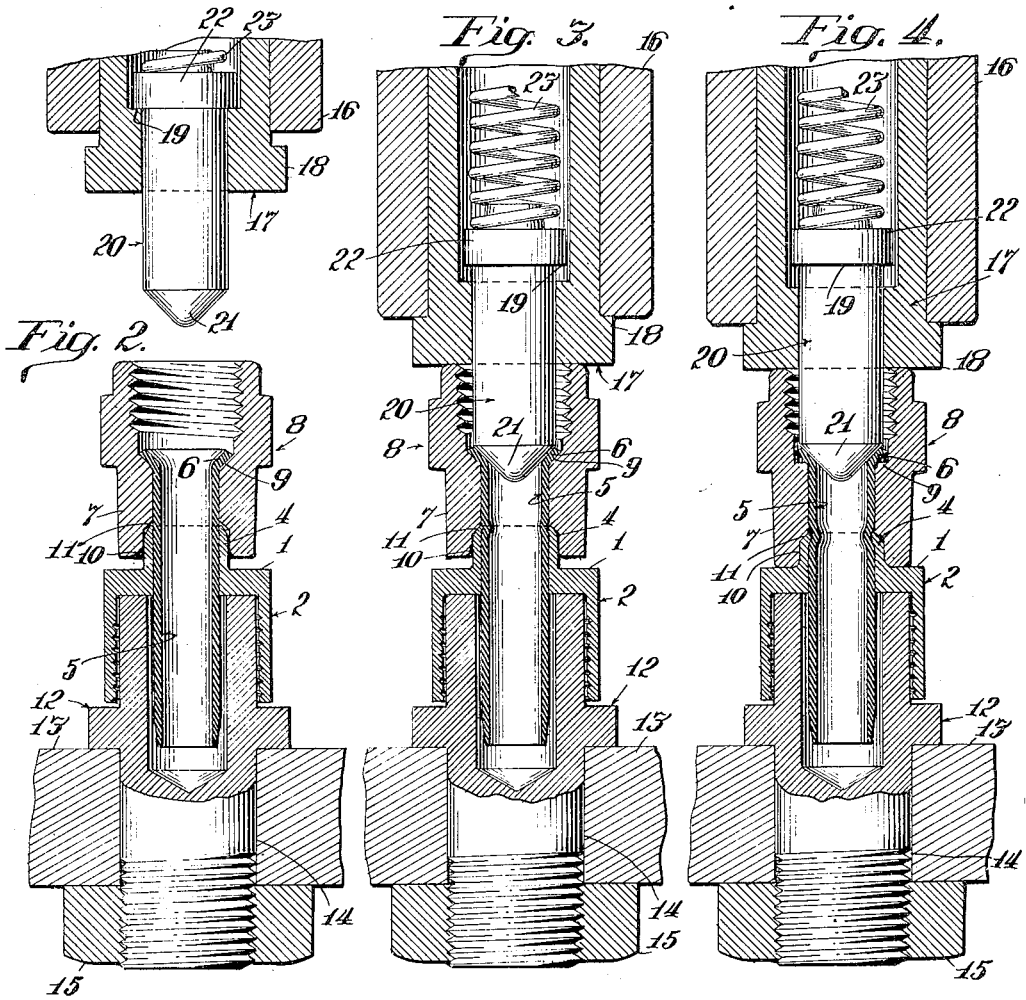
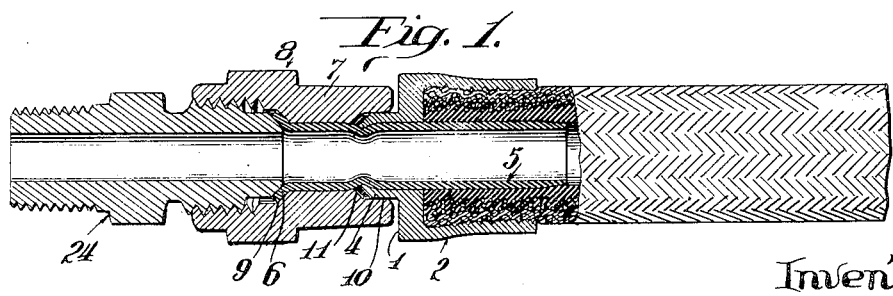
Inventor.
Irving Cowles
By Rudolph Wm. Lotz
Attorney.

Patented Mar. 20, 1934

1,951,860

UNITED STATES PATENT OFFICE 1,951,860

METHOD OF MAKING UNIONS FOR METAL TUBING

Irving Cowles, Detroit, Mich.

Application June 22, 1931, Serial No. 546,131

2 Claims. (Cl. 29—148.2)

This invention relates to improvements in so-called "unions" or union-joints common in the pipe-fitting industry, and has for its several objects to provide very simple and efficient structures of this character and, with respect to one of said structures, also to provide a very simple and efficient method of assembling the several component parts of the structure.

The present invention relates more particularly to providing coupling members, such as hose couplings as distinguished from ordinary pipe-fittings, with a rotatable nut for enabling such couplings, after attachment to hose or tubing, to be readily attached to rigid companion elements with which such hose or tubing is to be connected.

In the accompanying drawing illustrating an embodiment of the invention:

Fig. 1 is a central longitudinal sectional view of a hose coupling constructed in accordance with the invention, showing the same secured to one end of a flexible hose and, by means of the rotatable nut thereof, attached to a companion member.

Figs. 2, 3, and 4 are central longitudinal sectional views showing the component parts of the structure of Fig. 1 and a tool for effecting assembly thereof, said Figs. 2, 3, and 4 illustrating the method of this invention.

The hose coupling per se of the present invention corresponds substantially with that shown and described in United States Letters Patent No. 1,752,976, dated April 1, 1930, except as to equipment with a rotatable nut.

In the structure of Fig. 1 the end wall 1 of the hose coupling 2 is provided with a central opening which is bordered at its outer end by an initially internally cylindrical flange 4 which is preferably slightly tapered externally.

A tube 5 of an outer diameter substantially equal to that of the said central opening is inserted in the same. Prior to such insertion, the outer end of said tube is flared as at 6 and it is inserted through the axial bore of one end portion 7 of the nut 8, said axial bore being bordered at one end by a tapered seat formation 9 on which the flared flange 6 at one end of the tube 5 seats.

At the other end of the portion 7 of the nut 8, the axial bore of the latter is bordered by an annular recess 10 which is of very slightly larger diameter than said flange 4 and receives the latter. Said annular recess 10 is, however, of less depth than the length of said flange 4 and has a tapered inner end wall 11.

After the tube 5 has been inserted to extend through the axial bore of the end portion 7 of the nut 8, it is also inserted through the axial bore of the end wall 1 of the coupling 2 and its flange 4 and said coupling 2 then mounted upon the hollow cylindrical anvil member 3 of Fig. 2. The latter is provided with an annular flange 12 which rests upon a suitable support 13 about an opening 14 in the latter and is preferably clamped upon said support 13 by means of the nut 15 engaging the lower threaded end portion of said anvil member.

The plate or support 13 is preferably the bed plate of a punch-press, the plunger 16 of which carries a die 17 consisting of a hollow, cylindrical member having an external annular flange 18 to engage the lower end of the plunger 16 and which is provided with a central opening in its lower end bordered by an annular shoulder 19. A plunger 20 having a tapered lower end 21 to engage the flange 6 of the tube 5, is mounted for reciprocation within the die 17, is equipped with an annular flange 22 between its ends to seat on the shoulder 19 and to engage the lower end of a compression spring 23 which bears at its other end upon the upper end wall of the die 17, said wall being omitted from illustration.

The several component parts of the coupling being first loosely assembled and mounted upon the anvil member 3 as shown in Fig. 2, the punch-press is operated in the ordinary manner to cause the die 17 to engage the upper edge or rim of the nut 8 to force the same down to the position shown in Fig. 3. Prior to contact of the die 17 with the nut 8, the plunger 20 engages the flange 6 of the tube 5 to hold the same upon the seat formation 9.

As the nut 8 is forced to the position shown in Fig. 3, the tapered inner end wall 11 of the annular recess 10 of the portion 7 of nut 8 will have contracted the flange 4 of the member 2 to cause it to contract the tube 5 slightly annularly, as shown in Fig. 3, thereby to hold said tube against longitudinal movement relatively to the member 2.

During and prior to completion of the contraction of said flange 4, the latter will have attained so firm a hold on the tube 5 as to prevent further movement thereof relatively to the member 2 under the influence of the pressure exerted by the spring-pressed plunger 20 so that, after the downward movement of the die 17 to the position shown in Fig. 3, the plunger 20 and the tube 5 remain positioned as shown in Fig. 3 while the nut 8 continues to move to the position shown in Fig. 4 to complete the contraction of said flange 4 and thus complete the permanent assembly of the tube 5 and nut 8 with the coupling 2.

The punch-press plunger is now retracted and the completed assembly removed, the nut 8 now being capable of moving slightly longitudinally relatively to the tube 5 from the position shown in Fig. 4 to the position shown in Fig. 3 and vice versa, and is freely rotatable relatively to the tube 5 and member 2 to effect coupling of the member 2 and tube 5 with the companion member 24 shown in Fig. 1 by rotation of the nut 8 relatively to the member 2 and tube 5.

It will be understood, of course, that while the element 2 is herein illustrated and described as being a hose coupling, it may be structure adapted to other purposes within the limits of the invention.

I claim as my invention:

1. The method of producing a permanently assembled union which consists in providing a member having a central bore with a contractible flange, integral therewith and bordering one end of said bore, providing a union member having a central bore of substantially the same diameter as the bore of said first-named member with an annular recess at one end of its said bore to receive said flange of said first-named member and providing the latter and said recess with co-operating formations to cause said flange to be contracted annularly when forced into the said recess, providing a tube equipped with an annular flange at one end for engaging a shoulder at the other end of the bore of the said union member and inserting said tube through the latter and into the bore of the first-named member with its flange engaged with said shoulder of said union member and said tube toward first-named member and thereby effecting contract of the first-mentioned flange and permanently engaging the same with said tube, whereby said union member is permanently confined upon said tube.

2. The method of permanently assembling a union comprising a member having a central bore, a contractible annular flange integral with said member and bordering one end of said bore, a tube snugly fitting said bore and terminating at one end in an annular flange, a union member rotatable on said tube and engaged with said flange thereof, there being an annular recess in the end of said union member opposed to the first-named member and receiving said contractible flange of the latter, said last-named flange and said recess equipped with co-acting formations effecting contraction as said union member is forced toward said first-named member, said method consisting in first disposing said union member upon said tube in engagement with the flange of the latter, inserting the other end of the tube into the bore of the first-named member and moving both said tube and said union member to the limit of the movement toward said first-named member fixed by the contractible flange of the latter before contraction thereof, and then forcing said union member and said tube simultaneously further toward said first-named member, thereby contracting said contractible flange into permanent engagement with said tube for rigidly connecting the latter with said first-named member and permanently confining the union member upon said tube while permitting rotation of the same on said tube.

IRVING COWLES.